(12) United States Patent
Shin et al.

(10) Patent No.: US 8,264,605 B2
(45) Date of Patent: Sep. 11, 2012

(54) DEINTERLACER THAT ADAPTS TO IRREGULAR VIDEO CADENCE

(75) Inventors: Jaewon Shin, Santa Clara, CA (US); Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 130 days.

(21) Appl. No.: 12/976,256

(22) Filed: Dec. 22, 2010

(65) Prior Publication Data

US 2012/0162507 A1 Jun. 28, 2012

(51) Int. Cl.
*H04N 7/01* (2006.01)

(52) U.S. Cl. .......................... 348/448; 348/446; 348/441

(58) Field of Classification Search .................. 348/446, 348/448, 441, 455, 456, 458, 459; *H04N 7/01, H04N 11/20*
See application file for complete search history.

(56) References Cited

U.S. PATENT DOCUMENTS 7,280,155 B2 * 10/2007 Law et al. ...................... 348/448
8,174,614 B2 * 5/2012 Asamura et al. .............. 348/448

* cited by examiner

*Primary Examiner* — Sherrie Hsia
(74) *Attorney, Agent, or Firm* — Thomas, Kayden, Horstemeyer & Risley, LLP

(57) ABSTRACT

A method and system are provided in which a processor may detect one or more changes in video cadence in a video signal and may adjust a counter value based on each detected change in video cadence. The processor may increase the counter value by a determined amount for each detected change in video cadence. When the counter value becomes larger than a first threshold value, the processor may filter the video signal. The video signal may be filtered utilizing a vertical Nyquist notch filter. Moreover, after each increase, the processor may decrease the counter value based on a decay parameter. When the counter value is less than a second threshold value, where such second threshold value is less than the first threshold value, the processor may disable the filtering of the video signal.

20 Claims, 6 Drawing Sheets

DEINTERLACER THAT ADAPTS TO IRREGULAR VIDEO CADENCE

CROSS-REFERENCE TO RELATED APPLICATIONS/INCORPORATION BY REFERENCE

Not Applicable.

FIELD OF THE INVENTION

Certain embodiments of the invention relate to the processing of video signals. More specifically, certain embodiments of the invention relate to a method and system for a deinterlacer that adapts to irregular video cadence.

BACKGROUND OF THE INVENTION

An irregular video cadence in a video signal may be the result of video material being poorly edited or pictures in a picture-in-picture feature having different video cadences, for example. When video signals have an irregular or unstable video cadence, keeping a consistent video cadence lock and/or determining the correct video cadence may prove difficult and may result in visually unpleasing artifacts being displayed. Therefore, it may be desirable to handle the presence of an irregular or unstable video cadence in a video signal.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a deinterlacer that adapts to irregular video cadence, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
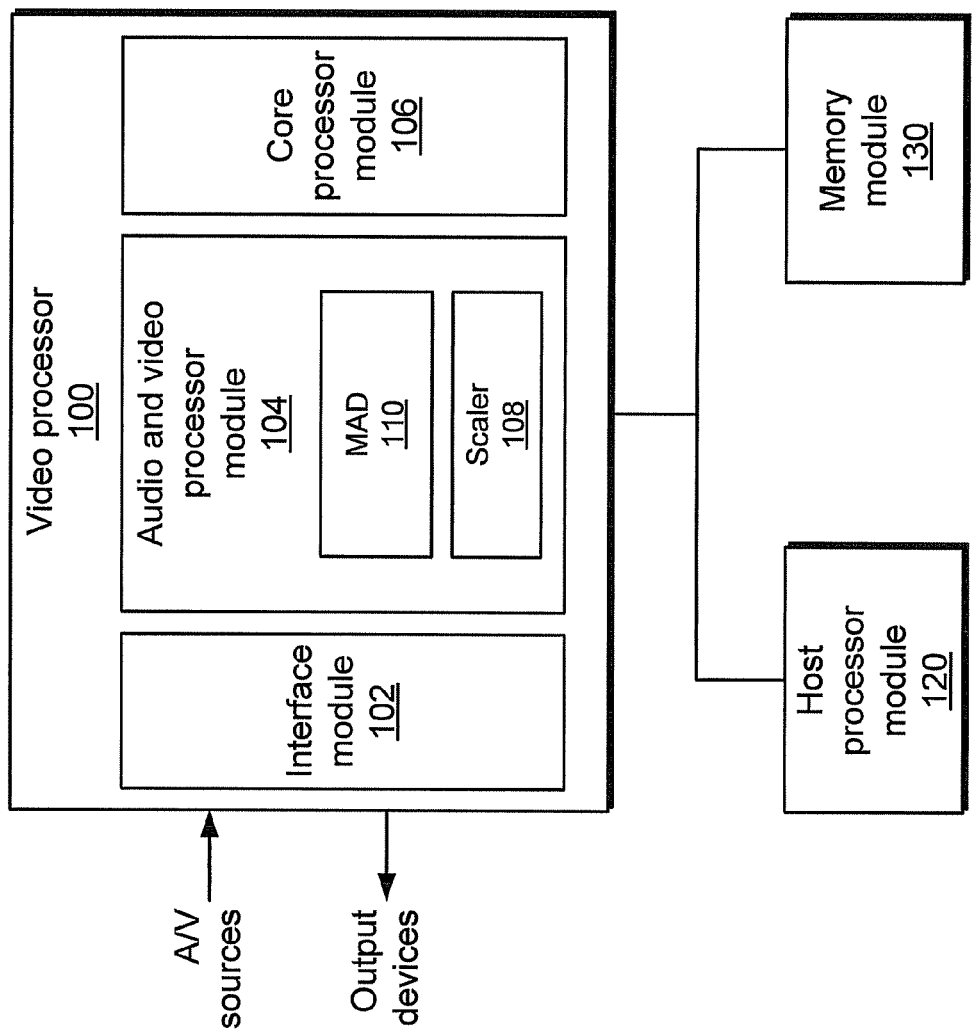
FIG. 1 is a block diagram that illustrates a system-on-chip that is operable to handle a video signal with an irregular video cadence, in accordance with an embodiment of the invention.

Certain embodiments of the invention may be found in a method and system for a deinterlacer that adapts to irregular video cadence. Various embodiments of the invention comprise a processor that may detect one or more changes in cadence in a video signal and may adjust a counter value based on each detected change in video cadence. The processor may increase the counter value by a determined amount for each detected change in video cadence. When the counter value becomes greater than a first threshold value, the processor may filter the video signal. The processor may filter the video signal utilizing a vertical Nyquist notch filter, for example. Moreover, after each increase, the processor may decrease the counter value based on a decay parameter. When the counter value is less than a second threshold value, where such second threshold value is less than the first threshold value, the processor may disable the filtering of the video signal.

A deinterlacer in a video processor may have a difficult time keeping a consistent video cadence lock and/or determining the correct video cadence of a video signal when the video cadence in the video signal changes rapidly, such as when the video cadence is irregular and/or unstable. In such instances, the video displayed may show artifacts that are visually unpleasing to a user.

A video signal may have an irregular or unstable video cadence when poorly edited material is generated by merely splicing together several video segments with different video cadences. For example, the scenes in a movie trailer may comprise interlaced video, 3:2 pull-down video, 2:2 pull-down video, or some other video cadence. When the splicing of the scenes is poorly done such that bad weaves occur at the transition between scenes, the movie trailer that results is likely to have an irregular video cadence.

A video signal with an irregular video cadence may also occur when the pictures in a picture-in-picture feature have different video cadences. For example, one picture may comprise interlaced video and the other picture may comprise 2:2 pull-down video. In such an instance, it may be difficult for the deinterlacer to lock to one video cadence or the other.

Various embodiments of the invention may provide a deinterlacer that is operable to detect when the video cadence in a video signal is irregular or unstable, and accordingly cause the video signal to be processed such that it provides a more visually pleasing experience. For example, when the video cadence is changing rapidly, when the video cadence is not stable, when the deinterlacer may not keep a consistent lock on the video cadence for more than a set number of frames, and/or when the deinterlacer may not determine within certain accuracy the video cadence, the deinterlacer may be operable to back off and apply a more conservative processing of the video signal to reduce the likelihood of artifacts in the displayed video. Below are described various embodiments related to a deinterlacer that may adapt its processing of a video signal when an irregular video cadence is detected in that video signal.

FIG. 1 is a block diagram that illustrates a system-on-chip that is operable to handle a video signal with an irregular video cadence, in accordance with an embodiment of the invention. Referring to FIG. 1, there is shown a system on chip (SoC) 100, a host processor module 120, and a memory module 130. The SoC 100 may comprise suitable logic, circuitry, code, and/or interfaces that may be operable to receive and/or process one or more signals that comprise video content. Examples of signals comprising video content that may be received and processed by the SoC 100 include, but need not be limited to, composite, blanking, and sync (CVBS) signals, separate video (S-video) signals, high-definition multimedia interface (HDMI) signals, component signals, personal computer (PC) signals, source input format (SIF) signals, and red, green, blue (RGB) signals. Such signals may be received by the SoC 100 from one or more audio visual (NV) sources communicatively coupled to the SoC 100.

The SoC 100 may generate one or more output signals that may be provided to one or more output devices for display, reproduction, and/or storage. For example, output signals from the SoC 100 may be provided to display devices such as cathode ray tubes (CRTs), liquid crystal displays (LCDs), plasma display panels (PDPs), thin film transistor LCDs (TFT-LCDs), plasma, light emitting diode (LED), Organic LED (OLED), or other flatscreen display technology.

The host processor module 120 may comprise suitable logic, circuitry, code, and/or interfaces that may be operable to control and/or configure the operation of the SoC 100. For example, parameters and/or other information, including but not limited to configuration data, may be provided to the SoC 100 by the host processor module 120 at various times during the operation of the SoC 100. The memory module 130 may comprise suitable logic, circuitry, code, and/or interfaces that may be operable to store information associated with the operation of the SoC 100. For example, the memory module 130 may store intermediate values that result during the processing of video data.

The SoC 100 may comprise an interface module 102, an audio and video processor module 104, and a core processor module 106. The SoC 100 may be implemented as a single integrated circuit comprising the components listed above. The interface module 102 may comprise suitable logic, circuitry, code, and/or interfaces that may be operable to receive multiple signals that comprise video. Similarly, the interface module 102 may be operable to communicate one or more signals comprising video content to output devices communicatively coupled to the SoC 100.

The core processor module 106 may comprise suitable logic, circuitry, code, and/or interfaces that may be operable to control and/or configure the operation of the SoC 100. For example, the core processor module 106 may be operable to control and/or configure operations of the SoC 100 that are associated with processing video content. In some embodiments of the invention, the core processor module 106 may comprise memory (not shown) that may be utilized in connection with the operations performed by the SoC 100. For example, the core processor module 106 may comprise memory that may be utilized during the processing of audio data, video data, and/or graphics data by the audio and video processor module 104.

The audio and video processing module 104 may comprise suitable logic, circuitry, code, and/or interfaces that may be operable to process audio data, video data, and/or graphics data. The audio and video processing module 104 may be operable to support multiple formats for video data, audio data, and/or graphics data, including multiple input formats and/or multiple output formats.

The audio and video processing module 104 may comprise a scaler module 108 and a motion-adaptive deinterlacer (MAD) module 110. The scaler module 108 may be operable to scale pictures associated with a video signal to adjust the pictures for processing and/or formatting. In some embodiments of the invention, the scaler module 108 may be operable to handle video signals with an irregular or unstable video cadence. For example, coefficients and/or software in the scaler module 108 may be modified to handle and/or perform operations associated with handling video signals with an irregular video cadence.

The MAD module 110 may be operable to convert interlaced video to progressive or non-interlaced video, for example. The MAD module 110 may also support inverse or reverse telecine operations that detect and remove 3:2 pull-down and/or 2:2 pull-down from telecined video signals. In this regard, the MAD module 110 may be operable to utilize motion information to process video signals. The MAD module 110 may also be operable to detect an irregular or unstable video cadence in a video signal and to adapt its operation to handle the video signal.

In operation, the SoC 100 may receive one or more video signals through the interface module 102. In processing one of those video signals, the MAD module 110 may detect one or more changes in video cadence in the video signal. The MAD module 110 may adjust the value of a counter (see counter module 210 in FIG. 2) based on each detected change in video cadence in the video signal. The MAD module 110 may increase the counter value by a determined amount for each detected change in video cadence. When the counter value reaches a certain value, the MAD module 110 may filter the video signal to generate a filtered video signal. The filtering may be performed utilizing a vertical Nyquist notch filter (see filter module 230 in FIG. 2).

Examples of changes in video cadence that may be detected by the MAD module 110 may comprise a transition in the video signal from progressive video to interlaced video, a transition in the video signal from interlaced video to progressive video, a transition in the video signal from 3:2 pull-down video to 2:2 pull-down video, a transition in the video signal from 2:2 pull-down video to 3:2 pull-down video, a transition in the video signal from telecine video to interlaced video, and/or a transition in the video signal from interlaced video to telecine video. These examples are provided by way of illustration and are not intended to be exhaustive of the types of changes in video cadence or other bad edits that may be detected by the MAD module 110.

The MAD module 110 may decrease the counter value based on a decay parameter after each increase by the determined amount. In this regard, the decay parameter utilized by the MAD module 110 may be dynamically modified by, for example, the core processor module 106 and/or the host processor module 120.

When the counter value becomes less than the value at which the filtering of the video signal was triggered, the MAD module 110 may blend the video signal and the filtered video signal to generate a blended video signal. Such blending may provide a smoother transition between the filtered video signal and the unfiltered video signal. The counter value may continue to decrease and, when it reaches another trigger value, the filtering of the video signal may be turned off or disabled.

Figure 2:
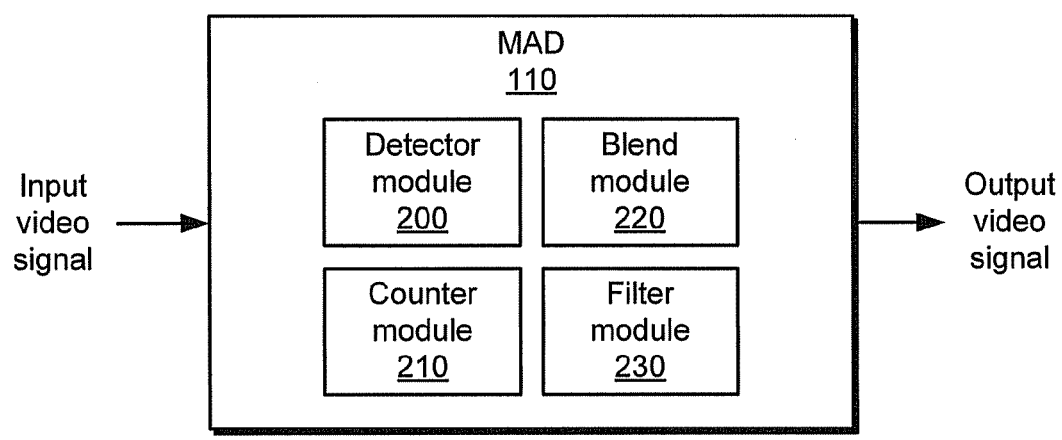
FIG. 2 is a block diagram that illustrates an exemplary deinterlacer that adapts to irregular video cadence, in accordance with an embodiment of the invention.

FIG. 2 is a block diagram that illustrates an exemplary deinterlacer that adapts to irregular video cadence, in accordance with an embodiment of the invention. Referring to FIG. 2, there is shown the MAD module 110 described above with respect to FIG. 1. The MAD module 110 may comprise a detector module 200, a counter module 210, a blend module 220, and a filter module 230.

The detector module 200 may comprise suitable logic, circuitry, code, and/or interfaces that may be operable to detect changes in the video cadence in an input video signal received by the MAD module 110. The counter module 210 may comprise suitable logic, circuitry, code, and/or interfaces that may be operable to adjust a counter value that is utilized to adapt the operation of the MAD module 110 based on the changes in video cadence detected by the detector module 200.

The filter module 230 may comprise suitable logic, circuitry, code, and/or interfaces that may be operable to filter the input video signal to generate a filtered video signal when a number of changes detected by the detector module 200 is such that the input video signal is considered to have an irregular or unstable video cadence. In this regard, the filter module 230 may comprise a vertical Nyquist notch filter that may be applied to the input video signal when the input video signal has an irregular or unstable video cadence. The luma contents of the input video signal may be filtered utilizing, for example, a 5-tap vertical Nyquist notch filter with coefficients [−3, 4, 14, 4, −3]/16. When deringing is enabled in the MAD module 110, a second luma filter may be utilized, such as a 3-tap filter with coefficients [1, 2, 1]/4, for example. The chroma contents of the input video signal may be filtered utilizing a static 3-tap filter with coefficients [1, 2, 1]/4, for example.

The blend module 220 may comprise suitable logic, circuitry, code, and/or interfaces that may be operable to blend the input video signal with the filtered video signal generated by the filter module 230 to generate a blended video signal. In this regard, the blended video signal may be described by the following expression:

$$b\_video\_signal(t) = avg(w_1(t) * i\_video\_signal(t) + w_2(t) * f\_video\_signal(t)), \quad \text{Eq. (1)}$$

where i_video_signal(t) is the input video signal, f_video_signal(t) is the filtered video signal generated by the filter module 230, b_video_signal(t) is the blended video signal, $w_1(t)$ is a first weight, and $w_2(t)$ is a second weight. The values of $w_1(t)$ and $w_2(t)$ are based on the value of the counter module 210. The blending performed by the blend module 220 may be enabled at certain times during the operation of the MAD module 110 to adapt to the presence of an irregular or unstable video cadence. Such blending may provide a smoother transition between having an output video signal of the MAD module 110 be based on the filtered input video signal and having the output video signal of the MAD module 110 be based on the unfiltered input video signal.

Figure 3:
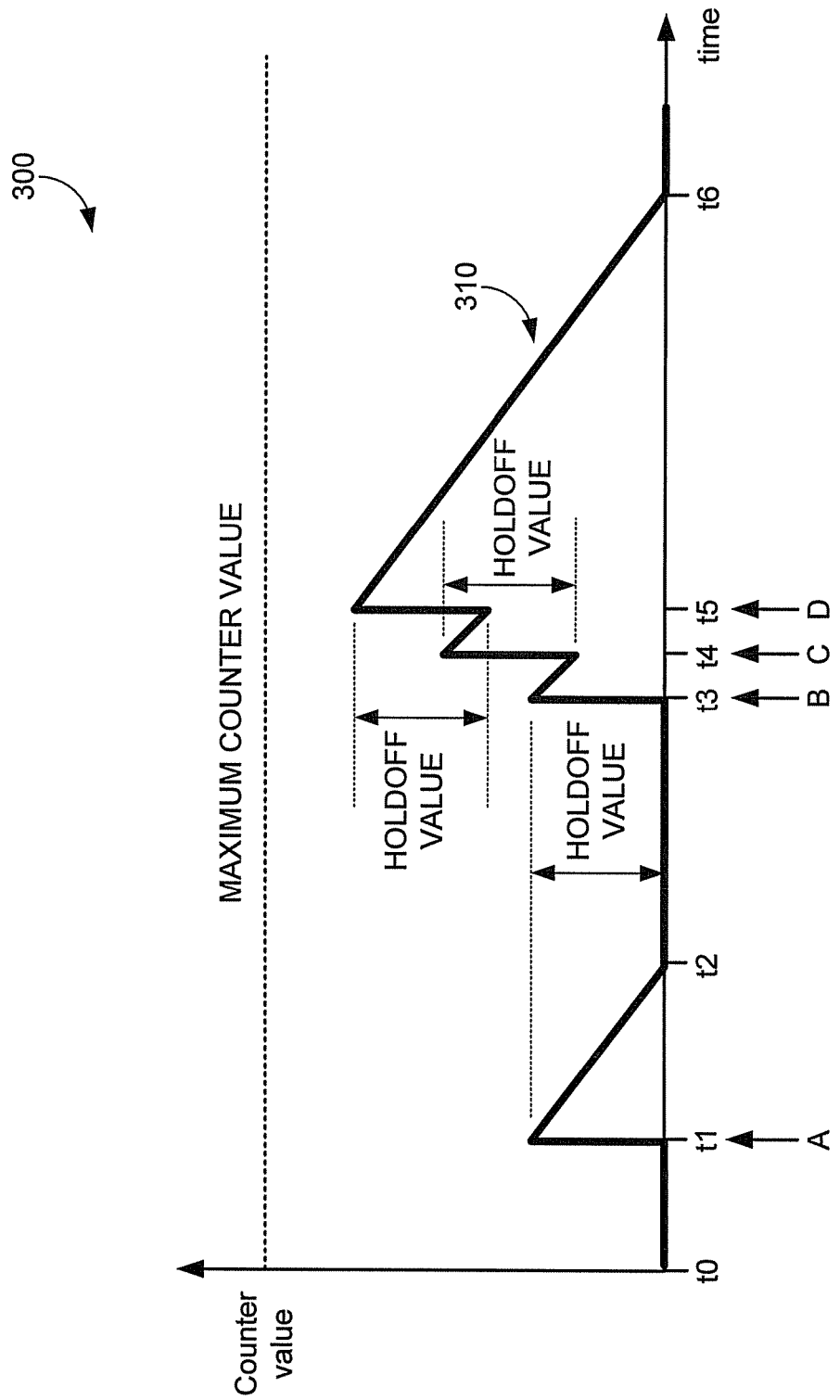
FIG. 3 is a diagram that illustrates the adjustment of a counter value when a change in video cadence is detected, in accordance with an embodiment of the invention.

FIG. 3 is a diagram that illustrates the adjustment of a counter value when a change in video cadence is detected, in accordance with an embodiment of the invention. Referring to FIG. 3, there is shown a diagram 300 that describes a graph 310 of exemplary changes that may occur in a counter value in the counter module 210 described above with respect to FIG. 2. The counter value is shown on the vertical axis of the graph 310, while time is shown on the horizontal axis of the graph 310.

In this example, the counter value starts at zero (0) at a time instant t0. At time instant t1, a first change in video cadence, labeled A, is detected by the detector module 200 in a video signal. Such change in video cadence may be communicated to the counter module 210, which in turn increases the counter value by a determined amount, referred to as a HOLDOFF VALUE. The increase in the counter value may occur rapidly as illustrated in FIG. 3. After the counter value is increased, the counter module 210 may decrease the counter value based on a decay parameter. The larger the decay parameter, the faster the counter value may be decreased. In this example, the counter value decreases back to zero at time instant t2.

A subsequent change in video cadence, labeled B, may be detected at time instant t3. As before, the detector module 200 may communicate the change in video cadence to the counter module 210, which in turn increases the counter value by the HOLDOFF VALUE. The counter module 210 may begin to decrease the counter value when another change in video cadence, labeled C, may be detected by the detector module 200 at time instant t4. In this case, the counter module 210 may be notified of the change in video cadence and may increase the current counter value at time instant t4 by the HOLDOFF VALUE. Again, after the increase takes place, the counter module 210 may begin to decrease the counter value. At time instant t5, another change in video cadence, labeled D, is detected by the detector module 200 and communicated to the counter module 210. Again, the counter module 210 increases the current counter value at time instant t5 by the HOLDOFF VALUE. No other changes in video cadence occur after D and the counter value is decreased by the counter module 210 back to zero at time instant t6.

As shown in FIG. 3, consecutive changes in video cadence may quickly increase the counter value. The counter value, however, may have a limit set by a MAXIMUM COUNTER VALUE to prevent rollover errors. That is, the counter value may not exceed the MAXIMUM COUNTER VALUE.

Figure 4A:
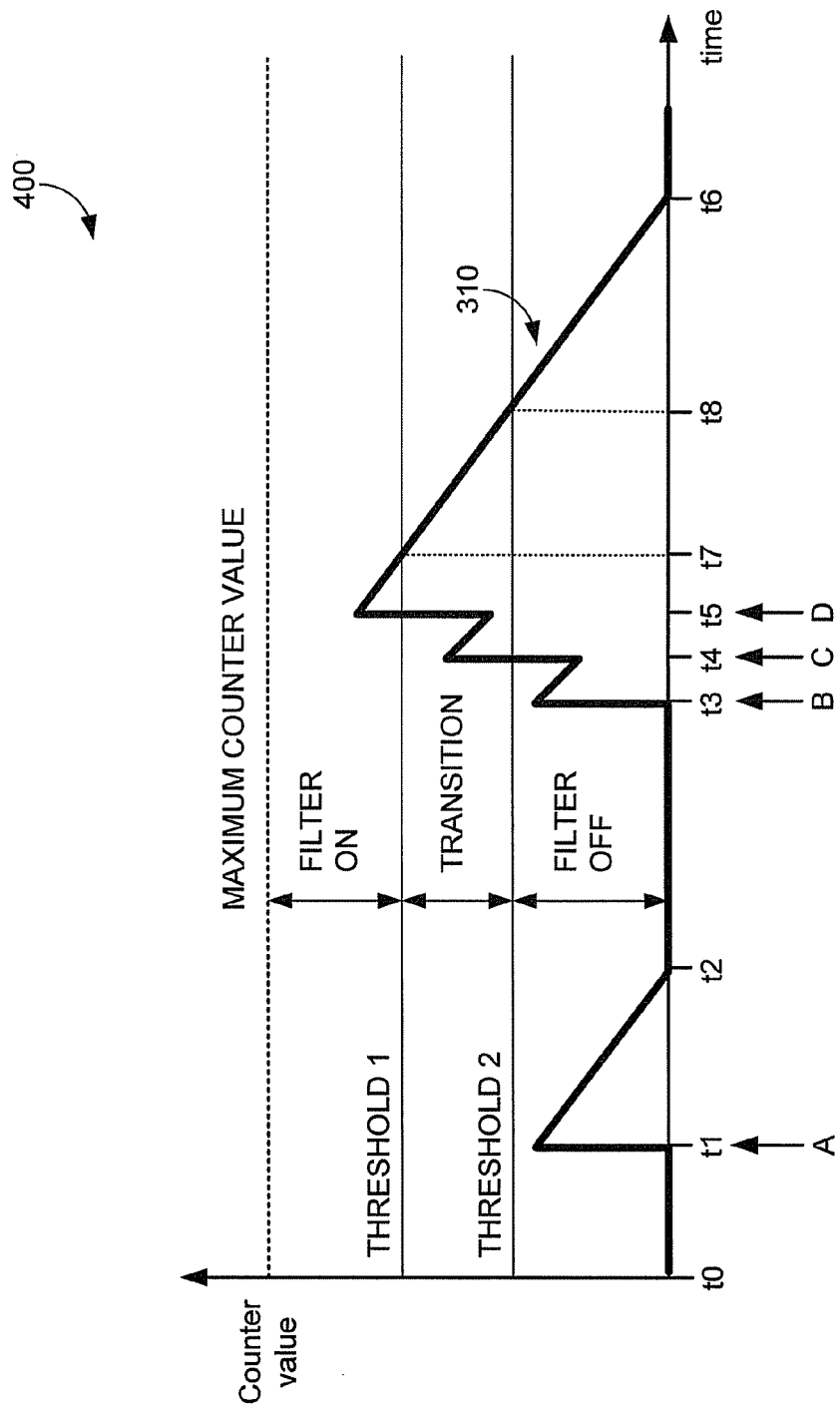
FIG. 4A is a diagram that illustrates a scenario in which a counter value is utilized to adapt a deinterlacer to irregular video cadence, in accordance with an embodiment of the invention.

FIG. 4A is a diagram that illustrates a scenario in which a counter value is utilized to adapt a deinterlacer to irregular video cadence, in accordance with an embodiment of the invention. Referring to FIG. 4A, there is shown a first scenario 400 associated with the graph 310 described above with respect to FIG. 3. In this scenario, the counter module 210 may set a first threshold value, THRESHOLD 1, and a second threshold value, THRESHOLD 2, both of which may be utilized to adapt the operation of the MAD module 110 to the presence of an irregular video cadence in the input video signal.

As shown in FIG. 4A, a region between a counter value of zero and the THRESHOLD 2 may be referred to as a FILTER OFF region. A region between the THRESHOLD 2 and the THRESHOLD 1 may be referred to as a TRANSITION region, and a region between the THRESHOLD 1 and the MAXIMUM COUNTER VALUE may be referred to as a FILTER ON region.

When the counter value is increased by the HOLDOFF VALUE at time instant t1, the counter value remains less than the THRESHOLD 1. In such an instance, the input video signal may be processed normally in the MAD module 110 and no filtering is performed by the vertical Nyquist notch filter in the filter module 230. That is, a single change in video cadence may not be visually unpleasing to a user to require changes in the operation of the MAD module 110.

When the counter value is increased at time instant t5, the counter value is now greater than the THRESHOLD 1. In such an instance, the input video signal may be filtered utilizing the vertical Nyquist notch filter in the filter module 230. That is, the series of changes in video cadence that resulted in the counter value being greater than the THRESHOLD 1 may be visually unpleasing to a user and the operation of the MAD module 110 may be adapted to reduce the artifacts that would otherwise result in the displayed video. In this instance, the counter module 210 may communicate with the filter module 230 to indicate that an irregular or unstable video cadence has been detected.

After time instant t5, the counter value may be in the FILTER ON region. The counter value, however, may be decreased by the counter module 210 after the increase at time instant t5 as described above. When the counter value becomes less than the THRESHOLD 1 at time instant t7, the counter value is now in the TRANSITION region. In this region, the blend module 220 may be enabled and the output video signal from the MAD MODULE 110 may be based on a blend of the input video signal and the filtered video signal generated by the filter module 230, as described in Eq. (1) above. The values of $w_1(t)$ and $w_2(t)$ may be adjusted based on the counter value. For example, the closer the counter value is to the THRESHOLD 1, the heavier the filtered video signal is to be weighted in Eq. (1). The closer the counter value is to the THRESHOLD 2, the heavier the input video signal is to be weighted in Eq. (1). In this manner, the filtering performed by the filter module 230 may be turned off gradually and not abruptly, which may cause visually unpleasing artifacts in the video when displayed. When the counter value may be in the TRANSITION region, the counter module 210 may communicate information to the blend module 220 properly generate the blended video signal.

When the counter value is less than the value of the THRESHOLD 2, such as at time instant t8, the counter value may be in the FILTER OFF region and the counter module 210 may communicate information to the filter module 230 to disable the filtering by the vertical Nyquist notch filter. The counter value may continue to decrease until the counter value reaches zero at time instant t6.

Figure 4B:
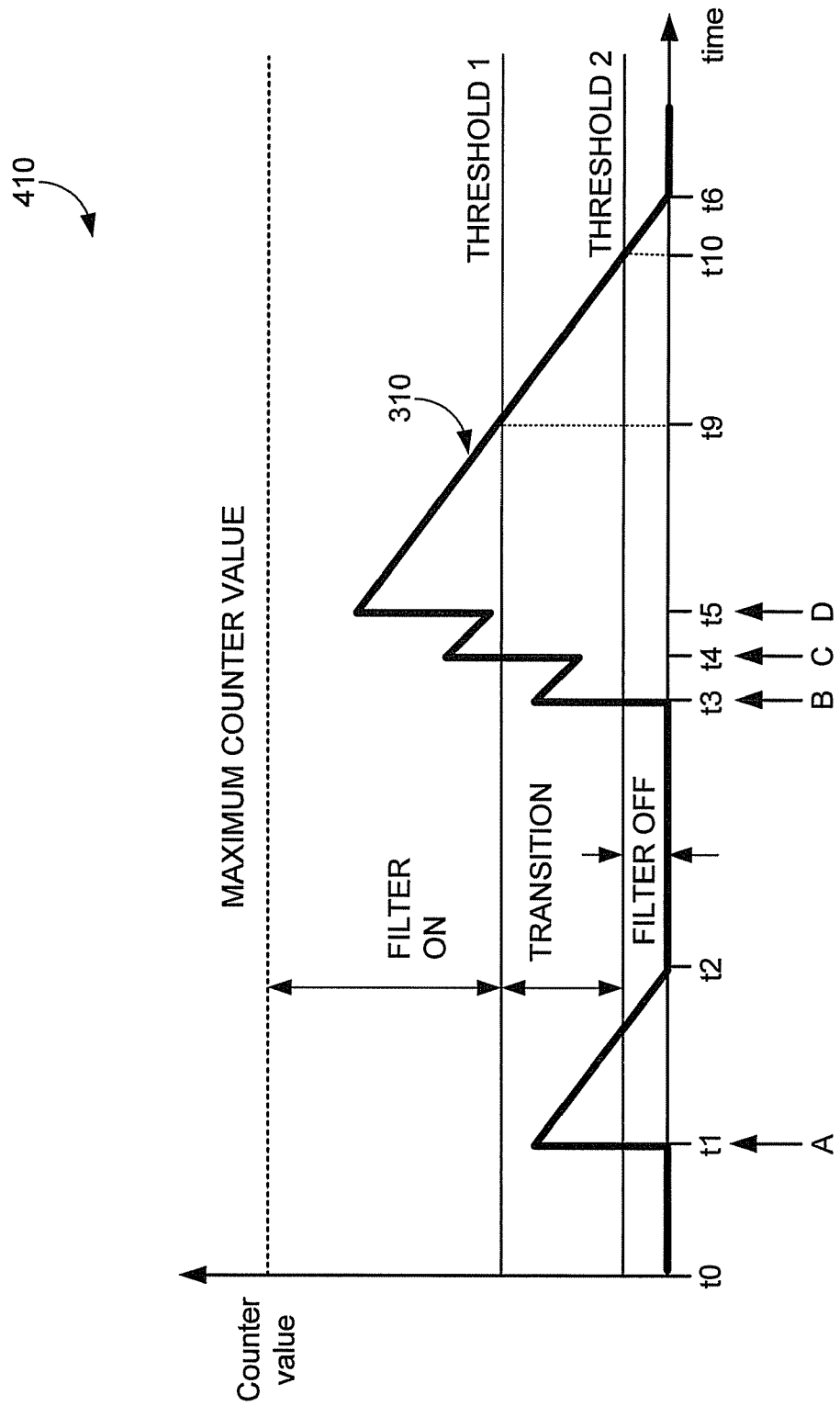
FIG. 4B is a diagram that illustrates another scenario in which a counter value is utilized to adapt a deinterlacer to irregular video cadence, in accordance with an embodiment of the invention.

FIG. 4B is a diagram that illustrates another scenario in which a counter value is utilized to adapt a deinterlacer to irregular video cadence, in accordance with an embodiment of the invention. Referring to FIG. 4B, there is shown a second scenario 410 associated with the graph 310 described above with respect to FIG. 3. In this scenario, the counter module 210 may set both the THRESHOLD 1 and the THRESHOLD 2 to be less than in FIG. 4A.

When the counter value is increased by the HOLDOFF VALUE at time instant t1, the counter value remains less than the THRESHOLD 1, just like in the first scenario 400 described above. When the counter value is increased at time instant t4, the counter value is now greater than the THRESHOLD 1. In such an instance, the input video signal may be filtered utilizing the vertical Nyquist notch filter in the filter module 230.

After time instant t4, the counter value may be in the FILTER ON region. The counter value, however, may be decreased by the counter module 210 after the increase at time instant t4. Another change in video cadence, D, is detected at time instant t5, after the counter module 210 has begun to decrease the counter value. In this case, the counter value may be increased again by the HOLDOFF VALUE before the counter value is decreased by the counter module 210. When the counter value becomes less than the THRESHOLD 1, such as at time instant t9, the counter value may now be in the TRANSITION region and the MAD module 110 may operate as described above with respect to FIG. 4A.

When the counter value becomes less than the THRESHOLD 2, such as at time instant t10, the counter value may be in the FILTER OFF region and the counter module 210 may communicate information to the filter module 230 to disable the filtering by the vertical Nyquist notch filter. The counter value may continue to decrease until the counter value reaches zero at time instant, t6.

As shown by the first scenario 400 and the second scenario 410 in FIGS. 4A and 4B, respectively, the operation of the MAD module 100 may vary based on how the THRESHOLD 1 and the THRESHOLD 2 are set. For example, in the first scenario 400, the counter value is in the FILTER ON region between time instants t5 and t7, which is less than the second scenario 410 where the counter is in the FILTER ON region between time instants t4 and t9. Accordingly, the conditions utilized to adapt the MAD module 110 to handle a video signal with an irregular video cadence may result in a longer application of the vertical Nyquist notch filter to the input video signal in the second scenario 410 than in the first scenario 400.

Figure 5:
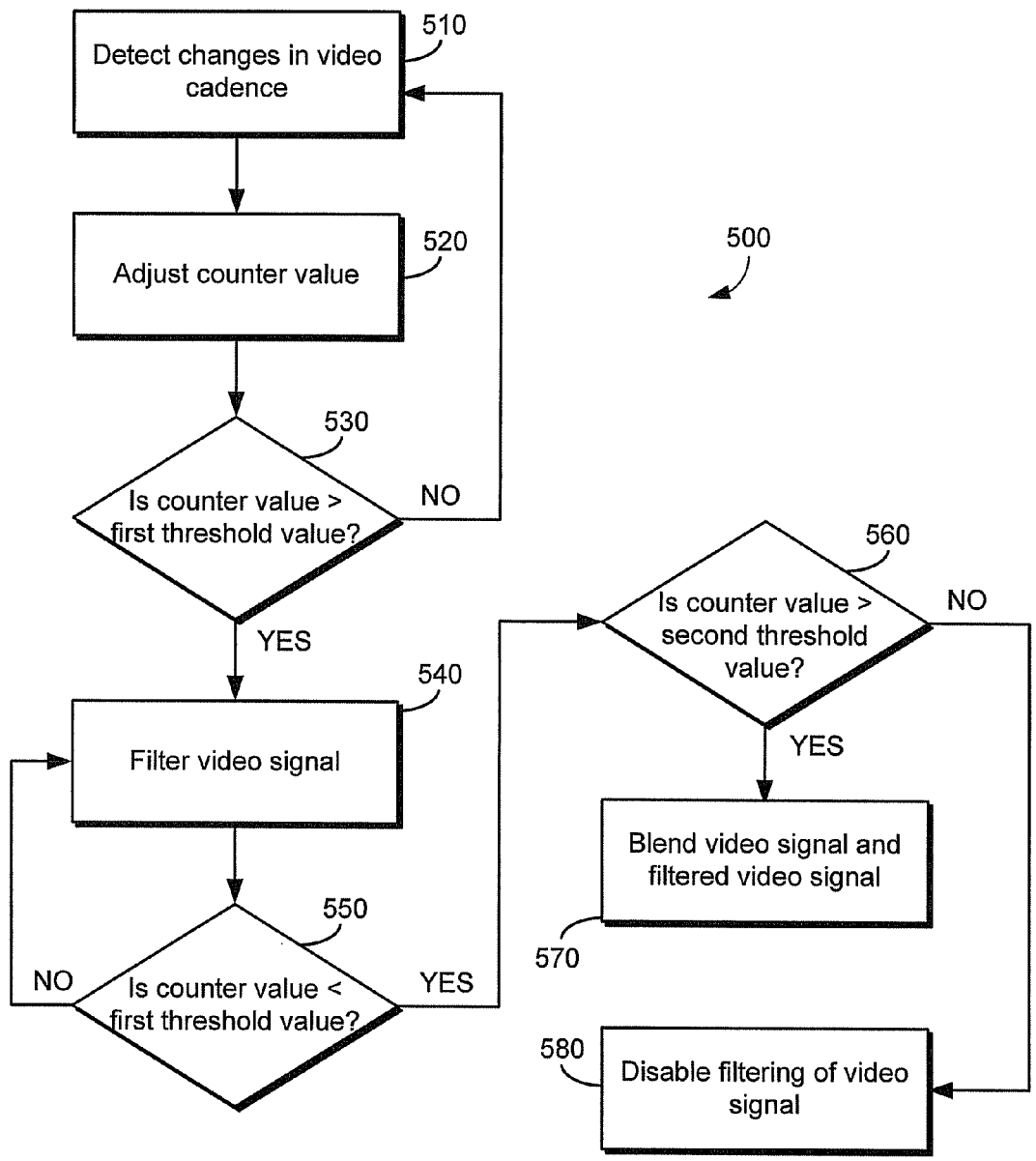
FIG. 5 is a flow chart that illustrates exemplary steps in the operation of a deinterlacer to adapt to irregular video cadence, in accordance with an embodiment of the invention.

FIG. 5 is a flow chart that illustrates exemplary steps in the operation of a deinterlacer to adapt to irregular video cadence, in accordance with an embodiment of the invention. Referring to FIG. 5, there is shown a flow chart 500 in which, at step 510, the MAD module 110 may detect changes in video cadence in a video signal. At step 520, the MAD module 110 may increase and/or decrease a counter value, such as the counter value of the counter module 210, based on the number of changes in video cadence that are detected. At step 530, when the counter value is greater than a first threshold value, such as the THRESHOLD 1 in FIGS. 4A and 4B, the process may proceed to step 540, where the video signal may be filtered utilizing a vertical Nyquist notch filter in the filter module 230. Returning to step 530, when the counter value is less than the first threshold value, the process may return to step 510 where additional changes in video cadence may be detected.

After step 540, in step 550, the MAD module 110 may determine whether the counter value is less than the first threshold value. If not, the process may proceed back to step 540 and the video signal may continue to be filtered. If the counter value is less than the first threshold value, the counter value may be in the TRANSITION region and the process may proceed to step 560. In step 560, the MAD module 110 may determine whether the counter value is greater than a second threshold value, such the THRESHOLD 2 in FIGS. 4A and 4B. If it is, the process may proceed to step 570 in which the video signal and the filtered video signal are blended by the blend module 220 to generate a blended video signal. When the counter value is less than the second threshold value, the counter value is in the FILTER OFF region and the process may proceed to step 580 in which the filtering by the vertical Nyquist notch filter in the filter module 230 may be disabled by the MAD module 110.

The diagrams and the flow chart described above with respect to FIGS. 3, 4A, 4B, and 5 are provided by way of illustration and not of limitation. Other scenarios, different from those described above, may be supported by the embodiments of the invention described herein.

While the adaptation of the SoC 100 to handle irregular or unstable video cadence in video signals has been described in connection with the MAD module 100, the invention need not be so limited. As indicated above, the scaler module 108 described above with respect to FIG. 1 may also be utilized to adapt the SoC 100 to handle irregular or unstable video cadence in a video signal. For example, various coefficients utilized by the scaler module 108 may be adjusted to enable hardware and/or software in the scaler module 108 to detect the presence of an irregular or unstable video cadence and to control the operations of the scaler module 108 to provide substantially the same functions as those described above with respect to the detector module 200, the counter module 210, the blend module 220, and the filter module 230 in the MAD module 110.

Various embodiments of the invention relate to a processor, such as the SoC 100 described above with respect to FIG. 1. The SoC 100 may be operable to detect one or more changes in video cadence in a video signal, adjust a counter value based on each detected change in video cadence, and filter the video signal when the adjusted counter value is greater than a threshold value. In this regard, the SoC 100 may comprise a vertical Nyquist notch filter and may filter the video signal utilizing such filter. The vertical Nyquist notch filter may be comprised within the filter module 230 in the MAD MOD- ULE 110 as described above with respect to FIG. 2. The counter value may be that of the counter module 210 described above with respect to FIG. 2. The threshold value may refer to the THRESHOLD 1 described above with respect to FIGS. 4A and 4B.

A change in video cadence may comprise a transition in the video signal from progressive video to interlaced video or a transition in the video signal from interlaced video to progressive video. A change in video cadence may comprise a transition in the video signal from 3:2 pull-down video to 2:2 pull-down video or a transition in the video signal from 2:2 pull-down video to 3:2 pull-down video. A change in video cadence may comprise a transition in the video signal from telecine video to interlaced video or a transition in the video signal from interlaced video to telecine video.

The SoC 100 may be operable to increase the counter value by a determined amount, such as the HOLDOFF VALUE, for each detected change in video cadence. The SoC 100 may be operable to decrease the counter value based on a decay parameter after each increase. In this regard, the SoC 100 may be operable to dynamically modify the decay parameter.

The SoC 100 may be operable to blend the video signal and the filtered video signal to generate a blended video signal when the counter value is less than the threshold value. A first weight applied to the video signal and a second weight applied to the filtered video signal to generate the blended video signal may both be based on the counter value. When the threshold value described above is a first threshold value, the SoC 100 may be operable to disable the filtering of the video signal when the counter value is less than a second threshold value, where such second threshold value is less than the first threshold value. The second threshold value may refer to the THRESHOLD 2 described above with respect to FIGS. 4A and 4B.

In another embodiment of the invention, a non-transitory machine and/or computer readable storage and/or medium may be provided, having stored thereon a machine code and/or a computer program having at least one code section executable by a machine and/or a computer, thereby causing the machine and/or computer to perform the steps as described herein for a deinterlacer that adapts to irregular video cadence.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a processor:
detecting one or more changes in video cadence in a video signal;
adjusting a counter value based on each detected change in video cadence; and
filtering the video signal when the adjusted counter value is greater than a threshold value.

2. The method of claim 1, wherein a change in video cadence comprises a transition in the video signal from progressive video to interlaced video or a transition in the video signal from interlaced video to progressive video.

3. The method of claim 1, wherein a change in video cadence comprises a transition in the video signal from 3:2 pull-down video to 2:2 pull-down video or a transition in the video signal from 2:2 pull-down video to 3:2 pull-down video.

4. The method of claim 1, wherein a change in video cadence comprises a transition in the video signal from telecine video to interlaced video or a transition in the video signal from interlaced video to telecine video.

5. The method of claim 1, comprising increasing the counter value by a determined amount for each detected change in video cadence.

6. The method of claim 5, comprising decreasing the counter value based on a decay parameter after each increase.

7. The method of claim 6, comprising filtering the video signal utilizing a vertical Nyquist notch filter.

8. The method of claim 6, comprising blending the video signal and the filtered video signal to generate a blended video signal when the counter value is less than the threshold value.

9. The method of claim 8, wherein a first weight is applied to the video signal and a second weight is applied to the filtered video signal to generate the blended video signal are both based on the counter value.

10. The method of claim 8, wherein the threshold value is a first threshold value and a second threshold value is less than the first threshold value, the method comprising disabling the filtering in the video signal when the counter value is less than the second threshold value.

11. A system, comprising:
a processor operable to detect one or more changes in video cadence in a video signal;
where the processor is further operable to adjust a counter value based on each detected change in video cadence; and
where the processor is further operable to filter the video signal when the adjusted counter value is greater than a threshold value.

12. The system of claim 11, wherein a change in video cadence comprises a transition in the video signal from progressive video to interlaced video or a transition in the video signal from interlaced video to progressive video.

13. The system of claim 11, wherein a change in video cadence comprises a transition in the video signal from 3:2 pull-down video to 2:2 pull-down video or a transition in the video signal from 2:2 pull-down video to 3:2 pull-down video.

14. The system of claim 11, wherein a change in video cadence comprises a transition in the video signal from telecine video to interlaced video or a transition in the video signal from interlaced video to telecine video.

15. The system of claim 11, wherein the processor is operable to increase the counter value by a determined amount for each detected change in video cadence.

16. The system of claim 15, wherein the processor is operable to decrease the counter value based on a decay parameter after each increase.

17. The system of claim 16, wherein:
the processor comprises a vertical Nyquist notch filter; and
the processor is operable to filter the video signal utilizing the vertical Nyquist notch filter.

18. The system of claim 16, wherein the processor is operable to blend the video signal and the filtered video signal to generate a blended video signal when the counter value is less than the threshold value.

19. The system of claim 18, wherein a first weight is applied to the video signal and a second weight is applied to the filtered video signal to generate the blended video signal are both based on the counter value.

20. The system of claim 18, wherein:
the threshold value is a first threshold value;
a second threshold value is less than the first threshold value; and
the processor is operable to disable filtering of the video signal when the counter value is less than the second threshold value.

* * * * *